CHARLES D. BLINN, OF PORT HURON, ASSIGNOR TO GEORGE CARY, OF DETROIT, MICHIGAN.

Letters Patent No. 87,391, dated March 2, 1869.

IMPROVEMENT IN THE PREPARATION OF SOLDER.

The Schedule referred to in these Letters Patent and making part of the same.

*To whom it may concern:*

Be it known that I, CHARLES D. BLINN, of Port Huron, in the county of St. Clair, and State of Michigan, have invented a new and useful Improvement in Preparation of Solder, to be used without a soldering-iron, or copper; and I do declare that the following is a true and accurate description thereof.

The object of this invention is to so prepare solder that it may be used to mend tin, iron, brass, copper, or zinc vessels, without the aid of the ordinary iron or copper used by tinsmiths, that will as readily mend iron as tin, and that will be effectual for the purpose.

In order to accomplish this end, I take the solder of commerce, and, by means of saws, files, or other appropriate device, reduce the same to a coarse powder, say granulated to about the coarseness of what are ordinarily termed "middlings" by millers. Then I dissolve one and a half pound of resin in one gallon of turpentine, after which I add and well mix a half ounce of refined coal-oil, petroleum, or other carbon-oil. I then immerse the pulverized or granulated solder in this compound, drain it off, and partially dry the same. If allowed to become fully dry, the compound would compel the mass to stick together.

This solder is treated in this manner, to prevent any liability of oxidation taking place when the tinning-flux is added, which it does by forming a hard glazing upon the particles of solder, that can only be removed by heat.

When the solder is thus partially dried, it is again immersed in the tinning-compound or flux, which is prepared in the following manner: Dissolve all the zinc that two pounds of muriatic acid (hydrochloric acid) will hold in solution, then add one pound of sal-ammoniac, (muriate of ammonia,) and allow the compound to boil a few moments. When cold, it is ready for use.

After the solder has been immersed in this last-mentioned compound, it should be thoroughly dried, then mixed with about its equal weight of pulverized or granulated solder, when it is ready for use.

To use the article thus prepared, it is simply required to scrape the metal to be repaired, immediately about the place, take a small amount of the solder, and place over the hole to be mended, and hold the spot directly over the flame of a lamp or candle until the solder is melted, when the work will be found to be as effectually done as it would have been had a tinsmith been employed with his iron or copper.

This invention will be found invaluable in almost every family, as a saving of time and expense will result from its use.

I am aware that various articles are used as a flux, both liquid and dry, and that solder is granulated, to be used in conjunction with fluxes thus prepared. I entirely disclaim them, as when such liquid fluxes are mixed with the solder, and allowed to stand a short time, a chemical change takes place, and the solder becomes a muriate of lead.

What I claim as my invention, and desire to secure by Letters Patent, is—

1. Preventing the solder from oxidation by the process herein described, or its equivalent, so that the tinning-compound or flux, when added, will not change the nature of the solder.

2. Preparing solder with a flux, substantially as herein described, as a new article of commerce, by the use of zinc, muriatic acid, and sal-ammoniac, or their equivalents, so that the solder can be used in a dry state.

C. D. BLINN.

Witnesses:
H. F. EBERTS,
WILLIAM LEIGHTON.